United States Patent [19]

Georgopoulos

[11] 4,248,325
[45] Feb. 3, 1981

[54] TACKABLE SOUND ABSORPTIVE PANEL

[75] Inventor: George Georgopoulos, Churchill Borough, Pa.

[73] Assignee: Westinghouse Electric Corp., Pittsburgh, Pa.

[21] Appl. No.: 973,990

[22] Filed: Dec. 28, 1978

[51] Int. Cl.³ .............................................. E04B 1/82
[52] U.S. Cl. .................................. 181/284; 181/290; 181/294
[58] Field of Search ........................ 181/286, 290-294, 181/284

[56] References Cited

U.S. PATENT DOCUMENTS

| | | | |
|---|---|---|---|
| 1,823,405 | 9/1931 | Mazer | 181/290 |
| 1,928,034 | 9/1933 | Schulstadt | 181/290 |
| 2,824,618 | 2/1958 | Hartsfield | 181/290 |
| 3,082,143 | 3/1963 | Smith | 181/294 |
| 3,441,465 | 4/1969 | Pearson | 181/290 |
| 3,605,851 | 9/1971 | Miles et al. | |
| 3,822,762 | 7/1974 | Crispin et al. | 181/292 |
| 3,895,670 | 7/1975 | Bales et al. | |
| 3,977,492 | 8/1976 | Hankel | 181/292 |
| 4,020,604 | 5/1977 | Legler et al. | |
| 4,047,337 | 9/1977 | Bergstrom | |
| 4,110,510 | 8/1978 | Oliveira | 181/294 |

Primary Examiner—L. T. Hix
Assistant Examiner—Benjamin R. Fuller
Attorney, Agent, or Firm—B. R. Studebaker

[57] ABSTRACT

An improved sound absorptive tackable space dividing wall panel or similar article in which a wire mesh screen is disposed within the sound absorptive material a distance from the tackable surface less than the length of the tack pin, thereby providing additional support for the tackable load without appreciably reducing the sound absorptive characteristics of the panel.

10 Claims, 7 Drawing Figures

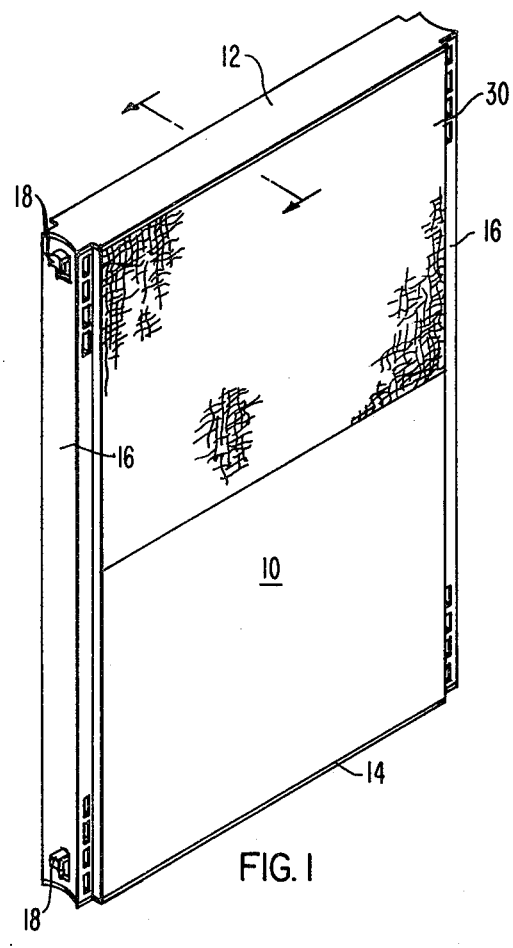
FIG. 1
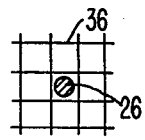
FIG. 6
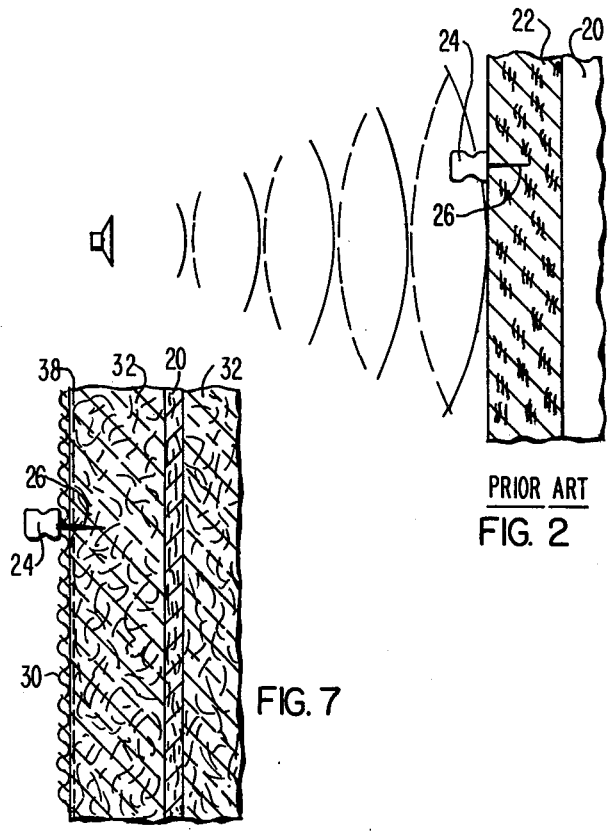
PRIOR ART
FIG. 2
FIG. 7
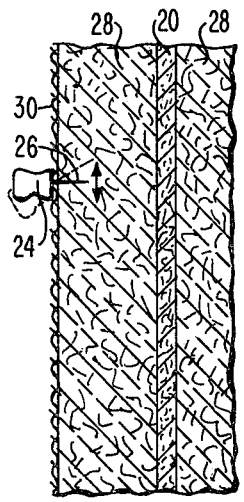
PRIOR ART
FIG. 3
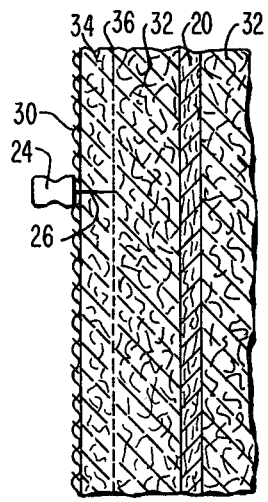
FIG. 4
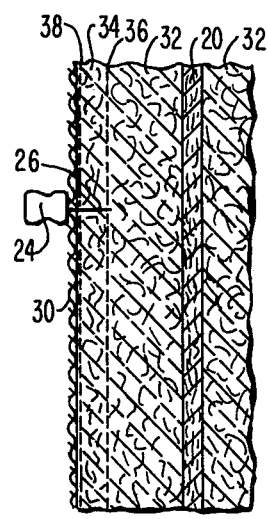
FIG. 5

TACKABLE SOUND ABSORPTIVE PANEL

BACKGROUND OF THE INVENTION

This invention relates to space dividing wall panels of the open-office plan type, and more particularly, to a wall panel which can serve both as a tackable surface as well as a sound absorptive panel.

As use of the open-office plan, employing space dividing wall panels, becomes more prevalent, it is readily apparent that acoustic performance of the panels in terms of sound absorption is becoming more important as a major selling factor as well as an architectural requirement. Integral bulletin boards or tackable surfaces are also a dominant feature of many space dividing wall panel systems. Unfortunately, sound absorption characteristics and the ability to maintain performance as a tackable surface over long periods of time are concepts which are diametrically opposed considering the present state of the art. Most available tackable boards or panels provide the very worst sound absorption characteristics because the tackable facing is almost always hard and highly reflective to sound which results in a reflective sound wave almost equally as intense as the incident sound wave. The soft surface panel which is in much use today usually employs a fiberglass or similar sound absorbing material with a cloth covering and is quite unacceptable as a tackable board or panel because its structural strength and life expectancy are damaged significantly by the pin portions of the tacks. One attempt to solve this problem employs sound absorptive material, usually fiberglass, pressed to a high density and inserted behind the cover cloth. The results are somewhat satisfactory but the material is more brittle and subject to surface contact damage, is more expensive to produce, and unsatisfactory as a sound absorptive medium at the higher frequencies. Accordingly, providing a combination of good sound absorption performance in a tackable panel is highly desirable.

SUMMARY OF THE INVENTION

The tackable sound absorptive panel of this invention is substantially equal in sound absorptive characteristics as conventional sound absorbing panels while evidencing good structural strength and maintenance even after numerous tackings thereto by conventional tack pins. The sound absorptive, tackable, space dividing wall panel of this invention is adapted to receive tack pins and the like of a predetermined length for supporting material thereto by including a first planar layer of sound absorptive material extending over a portion of at least one side of the space dividing wall panel. A wire mesh screen covers the outwardly facing surface of the first planar layer of sound absorptive material and a second planar layer of sound absorptive material covers the outwardly facing surface of the wire mesh screen, thereby sandwiching the wire mesh screen between the first and second planar sound absorptive layers. A cover cloth covers the outer surface of the second sound absorptive layer with the wire mesh screen being located a distance from the outer surface of the cloth cover which is less than a tack pin length.

In accordance with the present invention, a rigid frame is provided which surrounds a rigid central support member dividing the wall panel into two sides bounded by the frame; a first sound absorptive layer is provided on each side of the central support member and a wire mesh screen covers the outer surface of each of the first sound absorptive layers. A second sound absorptive layer covers the outer surface of each of the wire mesh screens and a cover cloth covering each of the second sound absorptive layers forms the outer surface of the sound absorptive tackable wall panel. The wire mesh screens are located a distance from the outer surface of the cover cloth so that the tips of the tacks or the like inserted into the cover cloth extend through the wire mesh screen. A second wire mesh screen, for additional structural support, can be interposed between the outer surface of the second sound absorptive layers and the cover cloth which forms the outer surface of the sound absorptive panel. The second layer of sound absorptive material can be eliminated and the cloth cover applied directly to the wire mesh screen if the wire mesh screen has been coated with a rubber-like substance. Of course, the wire mesh screen need only be applied to that portion of the panel which is intended to act as a tackable surface.

BRIEF DESCRIPTION OF THE DRAWING

Many of the attendant advantages of the present invention will become more readily apparent and better understood as the following detailed description is considered in connection with the accompanying drawing in which:

FIG. 1 is a perspective view of a space dividing wall panel constructed in accordance with the present invention;

FIG. 2 is a partial-sectional view illustrative of a prior art tackable wall panel;

FIG. 3 is a partial-sectional view illustrative of a prior art acoustical wall panel;

FIG. 4 is a partial-sectional view of a tackable sound absorptive wall panel constructed in accordance with the present invention;

FIG. 5 is a partial-sectional view of another embodiment of a tackable sound absorptive wall panel of this invention;

FIG. 6 is a schematic view illustrating the confinement of a tack pin by the wire mesh screen of this invention;

FIG. 7 is a partial-sectional view of a still further embodiment of a tackable sound absorptive wall panel of this invention.

DESCRIPTION OF THE PREFERRED EMBODIMENT

Referring now in detail to the drawings wherein like reference characters represent like parts throughout the several views, there is illustrated in FIG. 1 a typical space dividing wall panel of the type employed in the modern open-office plan systems, modified in accordance with the present invention. The wall panel is generally of the type disclosed in U.S. Pat. No. 3,762,116 for "Space Divider System And Connector Assembly Therefor" which may be utilized in connection with a plurality of cylindrical posts and other wall panels to provide a plurality of offices in accordance with the open-office plan concept. Although the panel generally designated 10 is illustrated with connecting hardware which is compatible with the cylindrical post systems, it should be understood that the connecting assembly for the panels is not significant with respect to this invention, and the tackable sound absorptive wall panel of this invention is applicable to any space dividing wall panel system regardless of the connecting hardware construction. As illustrated, the space dividing wall panel generally includes a rectangular structural frame of wood or metal which may be covered by, as for example, the top cover strip 12 and bottom cover strip 14, and also covered at its edges by edge cover strips 16 which, as illustrated in FIG. 1, represent steel slotted standards provided with connector hooks 18 for mounting to a cylindrical post. Generally, such panels are provided with a rigid central structural member or septum as illustrated at 20 in each of FIGS. 2 to 5 to which the remainder of the panel structure is secured in a sandwich type fashion.

Acoustical performance of a space dividing wall panel is becoming more important and the requirement is essentially defeated where the architects require the availability of tackable boards or the like in connection with the open-office plan. As illustrated in FIG. 2, contemporary tackable surfaces are usually provided by employing mineral board or cork 22 as the outer surface of the space dividing wall panel. The mineral board or cork surfaces are exceptionally suitable for receiving tack-type pins 24 with little destruction from the pin portion 26 thereof through repetitive use. Repetitive mounting of tackable loads to the tack board surface evidences no significant damage over the life of the panel. The problem is that the mineral board or cork tackable surface is probably the worst sound absorptive material available. The takable facing is essentially a hard and highly reflective surface to sound waves which results in a reflective sound almost equal in intensity to the incident sound wave as illustrated in FIG. 2.

A typical sound absorptive panel is illustrated in FIG. 3 and shows the septum or center support member 20 surrounded on each side by sound absorptive material, as for example, pressed fiberglass 28. A cover cloth 30 of, for example, burlap generally forms the outer surface of the space dividing wall panel. When a sound absorptive space dividing wall panel, constructed as illustrated in FIG. 3, is utilized as a tackable wall panel by the insertion of tacks 24 having pin extensions 26, lateral support for the pin extension 26 is inadequate. The pin portion 26 of the tack will generally move in response to weight thereon, creating destructive apertures or tears within the sound absorptive material. Repeated use of the wall panel as a tackable surface will create a plurality of these apertures or cavities which is eventually destructive of the panel as well as providing nonsupportive voids for later tack insertions.

In accordance with the present invention, the sound absorptive material 28 is essentially made in two layers as illustrated at 32, 34 of FIG. 4 and a wire mesh screen is inserted therebetween over the area to be utilized as a tackable surface. The wire mesh screen 36 lies in a plane within the wall panel spaced from the outer surface of the cover cloth 30 a distance which is slightly less than the length of the pin portion 26 of a conventional tack pin 24. When the tack pin 24 is inserted, the pin portion 26 extends through one of the apertures in the wire mesh screen 36, as illustrated in FIG. 6, and prevents lateral movement of the end of the pin within the sound absorptive material, thus eliminating destruction of the material and the creation of nonsupportive voids within the sound absorptive material.

In one alternative embodiment illustrated in FIG. 5, a second wire mesh screen 38 is sandwiched between the outer surface of the second sound absorptive layer 34 and the cover cloth 30, thereby providing a pair of spaced parallel lateral support structures, wire screens 36 and 38, for the pin portion 26 of the tack pin 24.

In a second alternative embodiment, illustrated in FIG. 7, a single wire mesh sceen 38 was bonded with a latex adhesive to the outer surface of a single layer of sound absorptive material and the cover cloth 30 applied directly to the outer surface of the wire mesh screen. Although tack support was not quite as good as the two screen embodiment, it was clearly adequate and construction costs are considerably cheaper.

In accordance with the specific embodiment, the septum or central structural support member 20 may be constructed from thick pressed paper, plywood, etc. or some other similar rigid supportive material, such as a paper honeycomb structure. In a typical panel 1½" thick, the septum is generally about ⅛" thick pressed paper. The sound absorptive material is preferably 6 lbs./ft.$^3$ pressed fiberglass, but any conventional sound absorptive material may be employed as a substitute for the fiberglass. The wire mesh screens 36 and 38 are preferably 16×18 mesh 32 gauge aluminum wire screens, but may be any similar wire screen, fiberglass screen, or polyvinyl chloride screen. Additionally, the screen may be coated with a rubber-like substance to improve pin retention. A thin coating of silicone rubber has been proven very successful in this application. The cover cloth may be any of the conventional cover cloths employed in sound absorptive panels; and in accordance with the invention as illustrated is burlap cover cloth.

If desired, the screen may be bonded to the insulating material. In one method of construction, the substrate, pressed fiberglass, was sprayed with a latex adhesive, diluted 50% with water, and a polyvinyl chloride screen pressed onto the tacky pressure sensitive adhesive.

A conventional sound absorptive panel 1½" thick, consisting of a burlap cover cloth with two layers of 11/16" thick 6 lbs./ft.$^3$ fiberglass with a ⅛" pressed paper septum was tested in a 10 cm. diameter impedance tube for normal sound absorption. This conventional sound absorptive panel yielded a noise reduction coefficient (NRC$_n$) rating of 0.6 as compared to a noise reduction coefficient (NRC$_n$) of 0.3 for a typical commercially available tackable panel consisting of burlap cover cloth on both sides with a mineral board, ½" thick tackable surface as illustrated in FIG. 2.

As an example, the conventional sound aborptive panel evidencing a noise reduction coefficient (NRC$_n$) rating of 0.60 was modified in accordance with the two screen construction of FIG. 5 using both coated and uncoated screens and the following noise reduction coefficients, rounded off to the nearest 0.05, for normal incidents were obtained:

| TACKABLE SOUND ABSORPTIVE PANEL | | |
|---|---|---|
| Uncoated Screens - (NRC$_n$) | = .66 | .65 |
| Coated Screens - (NRC$_n$) | = .52 | .50 |
| Front Screen Coated, Second Screen Uncoated - (NRC$_n$) | = .60 | .60 |
| Front Screen Coated, Second Screen Uncoated - (NRC$_n$) | = .54 | .55 |

From these tests it can be observed that at worst the (NRC$_n$) was reduced from 0.60 to 0.50 and at best it was actually increased to 0.65. A number of tacks were inserted into the tackable sound absorptive panels and in all instances the tacks stayed on the panel surface securely and carried its load without damage to the fiberglass portions of the panel.

As will be apparent from the foregoing, the tackable sound absorptive space dividing wall panel of this invention provides good acoustical characteristics in the form of sound absorption while additionally providing a tackable surface wherein the tacks are retained, do not damage the panel structure and will have the ability to carry loads on the tack equal to that of a conventional cork or mineral board tackable surface.

What is claimed is:

1. A sound absorptive tackable space dividing wall panel for receiving tacks and the like comprising:
   a frame;
   a rigid central support member dividing said wall panel into two sides and bounded by said frame;
   first sound absorptive layers on each side of said central support member;
   a wire mesh screen covering the outer surface of each of said first sound absorptive layers;
   a second sound absorptive layer covering the outer surface of each of said wire mesh screens; and
   a cover cloth covering each of said second sound absorptive layers and forming the surfaces of said sound absorptive tackable wall panel, the combined thickness of said second sound absorptive layer and adjacent cover cloth being less than the length of the pin portions of said tacks and the like intended for use therewith.

2. The sound absorptive tackable space dividing wall panel of claim 1 wherein said wire mesh screen is coated with a rubber-like substance.

3. A sound absorptive tackable space dividing wall panel according to claim 1 wherein a second wire mesh screen is interposed between the outer surface of each of said second sound absorptive layers and said cover cloth forming the surface of said sound absorptive panel.

4. The sound absorptive tackable space dividing wall panel according to claim 3 wherein said sound absorptive layers are pressed fiberglass and said rubber-like substance is silicone rubber.

5. A sound absorptive tackable space dividing wall panel adapted to receive tack pins and the like of predetermined length for supporting materials thereto, said sound absorptive tackable space dividing wall panel including:
   a first planar layer of sound absorptive material extending over a portion of at least one side of said space dividing wall panel;
   a wire mesh screen covering the outwardly facing surface of said first planar layer of sound absorptive material;
   a second planar layer of sound absorptive material covering the outwardly facing surface of said wire mesh screen, thereby sandwiching said wire mesh screen between said first and second planar sound absorptive layers; and
   a cover cloth, covering said second planar sound absorptive layer, said wire mesh screen being located between said planar sound absorptive layers a distance from the outer surface of said cover cloth which is less than a tack pin length.

6. The sound absorptive tackable space dividing wall panel according to claim 5 wherein said wire mesh screen is coated with a rubber-like substance.

7. The sound absorptive tackable space dividing wall panel according to claim 5 wherein a second wire mesh screen is interposed between the outer surface of said second planar layer of sound absorptive material and said cover cloth forming the surface of said sound absorptive panel.

8. The sound absorptive tackable space dividing wall panel according to claim 5 wherein said first and second planar layers of sound absorptive material are pressed fiberglass and said wire mesh screen is aluminum.

9. The sound absorptive tackable space dividing wall panel of claim 7 wherein said second screen interposed between the outer surface of said second sound absorptive layer and said cover cloth is coated with a rubber-like substance and said wire mesh screen between said first and second planar sound absorptive layers is uncoated.

10. The sound absorptive tackable space dividing wall panel of claim 5 wherein said wire mesh screen is a polyvinyl chloride screen and said screen is bonded to said planar layer of sound absorptive material with a latex adhesive.

* * * * *